Figure 1:
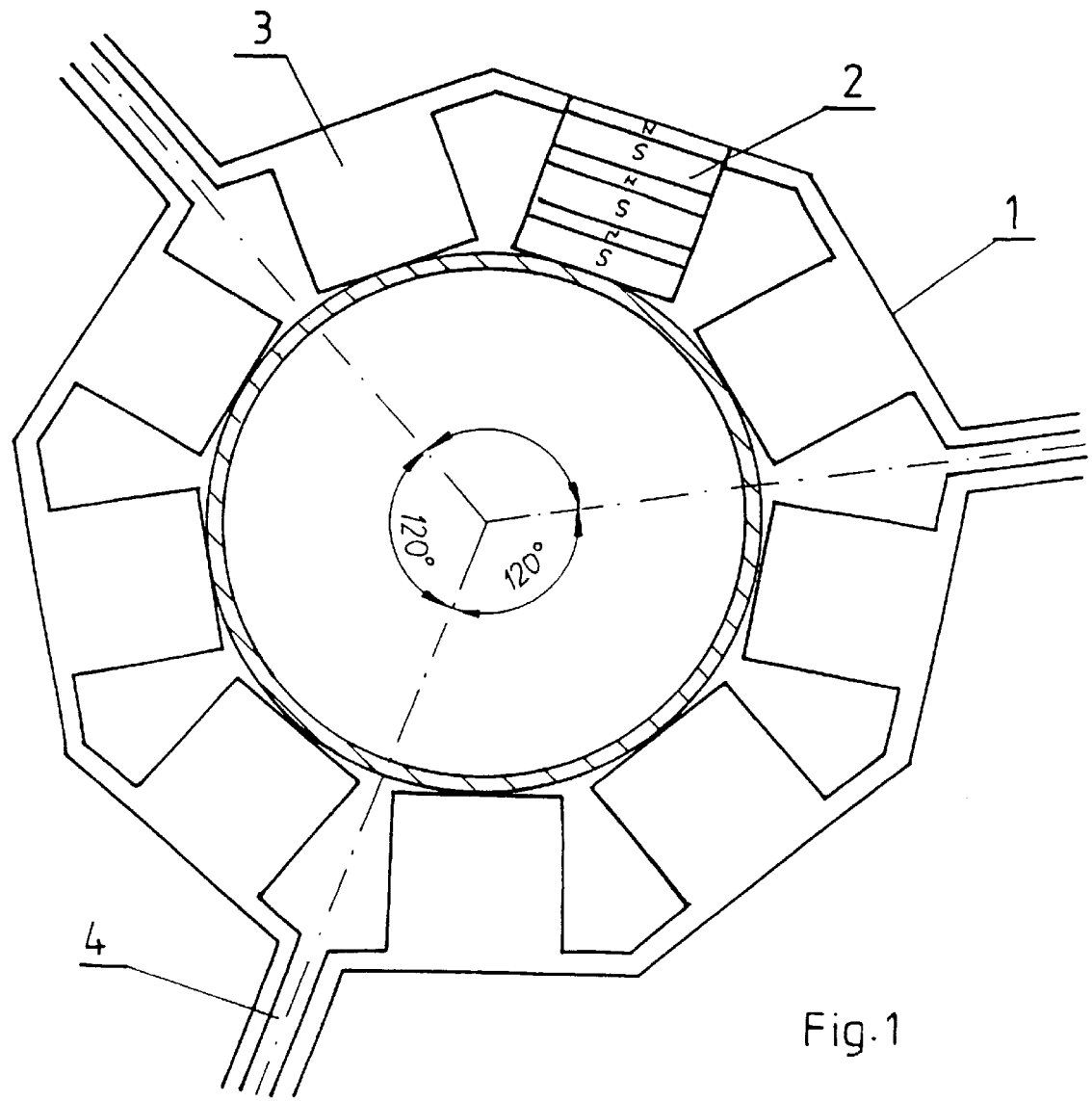

United States Patent

Witaszak et al.

[11] Patent Number: 6,143,045
[45] Date of Patent: Nov. 7, 2000

[54] METHOD AND A DEVICE FOR THE MAGNETIC ACTIVATION OF SOLID, LIQUID AND GAS MEDIA, ESPECIALLY COAL DUST AND OTHER HYDROCARBON FUELS

[75] Inventors: Krystian Witaszak, Poznań; Wojciech Nowak; Andrzej Szczypiorowski, both of Czestochowa, all of Poland; Norio Arai, Nagoya, Japan; Anders Nils Gustaf Kullendorff, Göteborg; Lennart Sven Rorgren, Malmö, both of Sweden; Andrzej Rzeplinski, Warszawa, Poland; Witalis Marek Zientek, Warszawa, Poland; Marek Zelazkiewicz, Czestochowa, Poland

[73] Assignees: Centrum Badawczo-Produkcyjne Sorbentówi Czystychtechnologii Wegla "Ekocentrum" Spólka ZO.O., Czestochowa; Przedsiebiorstwo Techniczno - Handlowe Akra - Anna Rzeplińska, Warszawa; Biuro Kooperacji Miedzynarodowej Trust International - Krystian Witaszak, Poznań all of Poland

[21] Appl. No.: 09/380,330
[22] PCT Filed: Mar. 5, 1998
[86] PCT No.: PCT/PL98/00007
§ 371 Date: Nov. 1, 1999
§ 102(e) Date: Nov. 1, 1999
[87] PCT Pub. No.: WO98/39564
PCT Pub. Date: Sep. 11, 1998

[30] Foreign Application Priority Data

Mar. 7, 1997 [PL] Poland ..................................... 318868

[51] Int. Cl.⁷ ................................. C10L 1/00; C10L 5/00
[52] U.S. Cl. ................................. 44/620; 44/629; 210/222; 335/306
[58] Field of Search ..................... 44/620, 629; 210/222; 335/306

[56] References Cited

U.S. PATENT DOCUMENTS

| | | | |
|---|---|---|---|
| 4,265,754 | 5/1981 | Menold | 210/222 |
| 4,568,901 | 2/1986 | Adam | 335/305 |
| 4,605,498 | 8/1986 | Kulish | 210/222 |
| 4,808,306 | 2/1989 | Mitchell et al. | 210/222 |
| 5,063,368 | 11/1991 | Ettehadieh | 335/301 |
| 5,359,979 | 11/1994 | Anfinson et al. | 123/538 |

FOREIGN PATENT DOCUMENTS

| | | |
|---|---|---|
| 0 545 704 | 6/1993 | European Pat. Off. . |
| 0 689 869 | 1/1996 | European Pat. Off. . |
| 42 23 628 | 1/1994 | Germany . |
| 93 15 673 | 2/1994 | Germany . |
| 58-025561 | 2/1983 | Japan . |
| 164 664 | 9/1994 | Poland . |
| 1 346 584 | 10/1987 | U.S.S.R. . |

*Primary Examiner*—Margaret Medley
*Assistant Examiner*—Cephia D. Toomer
*Attorney, Agent, or Firm*—Collard & Roe P.C.

[57] ABSTRACT

A method of magnetic activation of solid, liquid and gas media, especially coal dust and other hydrocarbon fuels, consists in that media are treated by asymmetrical magnetic field produced by permanent magnets of diversified and asymmetrical capacity densities of magnetic field energy between the poles 'N' and 'S' of the magnets. The value of energy at the side of one of the poles equals up to 190% of the value of magnetic field energy density of the opposite sign pole. A device working according to the invention method is characterized in that the above described 'asymmetrical' magnets are mounted to a casing made of para-, dia-, and ferromagnetic materials, the magnets forming piles and at least a half of them being 'asymmetrical' magnets.

5 Claims, 2 Drawing Sheets

METHOD AND A DEVICE FOR THE MAGNETIC ACTIVATION OF SOLID, LIQUID AND GAS MEDIA, ESPECIALLY COAL DUST AND OTHER HYDROCARBON FUELS

The invention concerns a method of magnetic activation of solid, liquid and gas media, especially coal dust and other hydrocarbon fuels, applied to commercial scale of production and to house systems, and a device for application of the method.

Physical-and-chemical mechanism of magnetic field treatment of various media, especially hydrocarbon fuels, is considered to be very complex and not fully explained by the contemporary world science. The method of magnetic activation of carbon dust, tar, pitch, mazout and coke-oven gas has not been known yet.

Whereas the hitherto known methods of magnetic treatment of liquid and gas media consists in acting on above mentioned media, transferred through a transport channel, with a magnetic field produced in arrangements of permanent magnets, in which the 'S'-pole magnetic field energy is equal to the 'N'-pole magnetic field energy. Depending on the kind of medium, a set of magnets and its arrangement are selected so that the best effects of physical, technical, operating and the like property improvements of given medium are obtained, and comparative tests of different solutions are conducted.

Basing on these researches conducted by a team of international scientists, devices for magnetic activation, called magnetic activators, of different kind were designed.

All hitherto known magnetic activators have been built from traditional, commercially produced permanent magnets assembled into piles, mounted in a casing made from a ferromagnetic material. The 'N'-pole magnetic field energy of every magnet equals to the 'S'-pole magnetic field energy of the magnet.

Thus, there is known, from the Polish patent specification No. 164 664, a device for magnetic fluid treatment provided with magnetic sets of longitudinally changed polarity, composed of plate permanent magnets, situated outside, along a fluid duct and with magnetic axes perpendicular to the duct axis. The magnetic sets are mounted parallel inside a plate body made from non-magnetic plastic-strainable material and in the symmetry axis between the magnet sets the body has through grooves, the bottom of which together with the body base is a connector of little thickness. Moreover, the device has a band which presses the body, bent along the connectors' axis, to the duct so that the base takes the shape of an open polygon circumscribed on the outside surface of the duct.

Other similar solutions are known from the U.S. Pat. Nos. 4,605,498, 4,568,901, 4,808,306 and 4,265,754.

All these more or less complex constructions of magnetic activators comprise permanent magnets of the same magnetic field energies of the poles 'N' and 'S'.

There is known, from the Japan patent specification No. 0 545 704, a method of combustion of a fuel in an engine where the fuel is exposed to magnetic field generated by a magnet of flux density in the range of 5–18 gauss at the pole 'S' and less than about 6 gauss at the pole 'N', wherein the ratio of magnetic flux density at the poles 'N' and 'S' of the magnet is equal to or less than 0.5. The combustion is performed with simultaneous exposing of air supplied to the engine to a magnetic field of flux density in the range from 300 to 3000 gauss near the cylinder block of the engine.

In order to get asymmetry of magnetic flux density at the poles 'N' and 'S' of magnets used in the method, an artificial attenuation of the flux density value on the surface of one pole is applied by putting a metal plate of small remanence onto a chosen pole.

Unexpectedly it appeared that replacement of the magnets used until now with the magnets which manufacture is based on an innovative in the world scale technology of the 'know-how' type gave incomparably better effects of magnetic activation of media and allowed to design new magnetic activators for significantly larger range of hydrocarbon fuels.

A method according to the invention is that solid, liquid or gas media, transferred along transport channels, undergo asymmetrical magnetic field activity.

The essence of the invention consists in that the media undergo asymmetrical magnetic field produced by permanent magnets of diversified and asymmetrical capacity densities of magnetic field energy between the poles 'N' and 'S' of the magnets so that the value of energy at the side of one of the poles equals up to 190% of the value of magnetic field energy density of the opposite sign pole. The magnets are set into magnet piles and a degree of asymmetry of magnetic field energy density, contained in the range from 0.52 to 0.9, is determined depending on kind of medium, flow parameters and kind of material from which the channels transporting medium are made.

The device for realization of the method is characterized in that the casing is made from para-, dia- and ferromagnetic materials and there are mounted to it permanent magnets of diversified capacity density of magnetic field energy between the poles 'N' and 'S' so that the value of the energy at the side of one of the poles equals up to 190% of the value of energy density of the opposite sign pole. The magnets are in piles where magnets of diversified magnetic field energy capacity density between the poles 'N' and 'S' are at least a half of all magnets in pile.

The magnet piles form spatial arrangements of permanent magnets of a diversified energy capacity density of the poles 'N' and 'S' with magnets of the same energy density of the poles All media activated by the method and with use of the device according to the invention were characterized by far better modifications of their properties. Besides resonant excitation of the substance in the area of flow there was obtained improvement of such phenomena as trajectory swirl of charged and diamagnetic particles, selective ionization, circulating eddy currents, electric and magnetic fields, speed and pressure profile changes and electric fluid conductivity. In case of fuels, higher loosening of hydrocarbon structure, polarization and orientation of molecules were obtained, as accurate analyses of combustion processes, thermographic distribution of flames and industrial furnace interiors and reduction of fuel consumption confirmed much higher efficiency of magnetic treatment with the method according to the invention rather than with hitherto known methods.

Owing to application of the method of the invention for the first time in the world an unexpected effect of effective and stable-in-time magnetic activation of such fuels as carbon dust, mazout, tar, pitch and coke-oven gas was obtained and consumption of fuels was reduced by about 15% with simultaneous reduction of CO, HC, $SO_2$ and $NO_x$ emission. Moreover, far better effects of water and liquid activation than with use of hitherto known methods were obtained through changes of such parameters as electrical conductivity, viscosity, light extinction, surface wettability of solids and decrease of their surface tension, owing to which a lot of technological processes can be improved.

Moreover, after application of the method there was found that crystal formation in salt solutions is accelerated inside solutions but not on duct walls, process of suspension dissolving and coagulation is intensified, concentration of dissolved oxygen and carbon dioxide increases, bond stability of solids in deposits and adsorption on phase separation surface gets higher. The changes influence fundamentally on the course of various physico-chemical processes and decide improvement of production process effectiveness and better equipment use.

In case of hydrocarbon fuels, the magnetic treatment method according to the invention caused shortening of magnetic saturation time of installation and equipment by 35%, increase of thermal energy inside flame, increase of energy of heat radiation into environment, decrease of flame fluctuation amplitude and frequency, reduction of CO, HC, $SO_2$ and $NO_x$ emission higher than with use of other magnetic activators by 20% to 30%, equalization of temperature distribution inside furnace chamber, removal of thermal peaks, maintenance of stable work conditions of gas, oil and carbon dust burners after long operation period.

Figure 2:
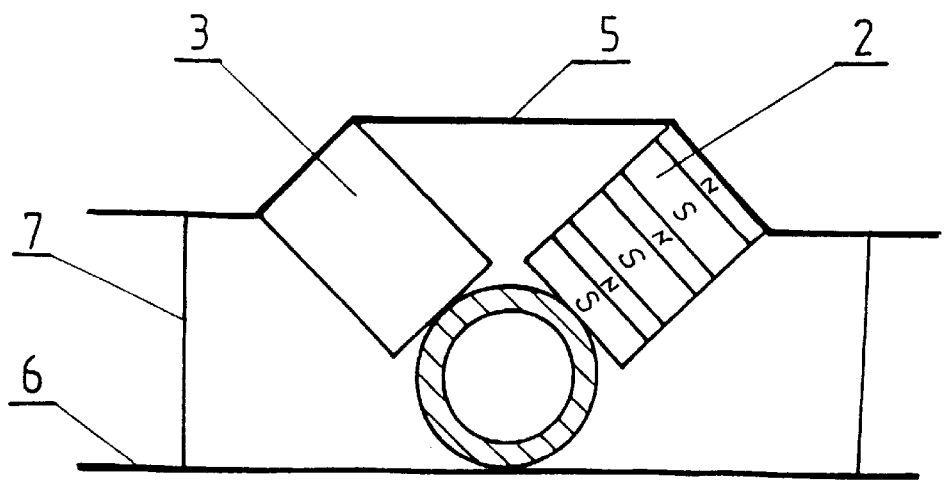
Figure 3:
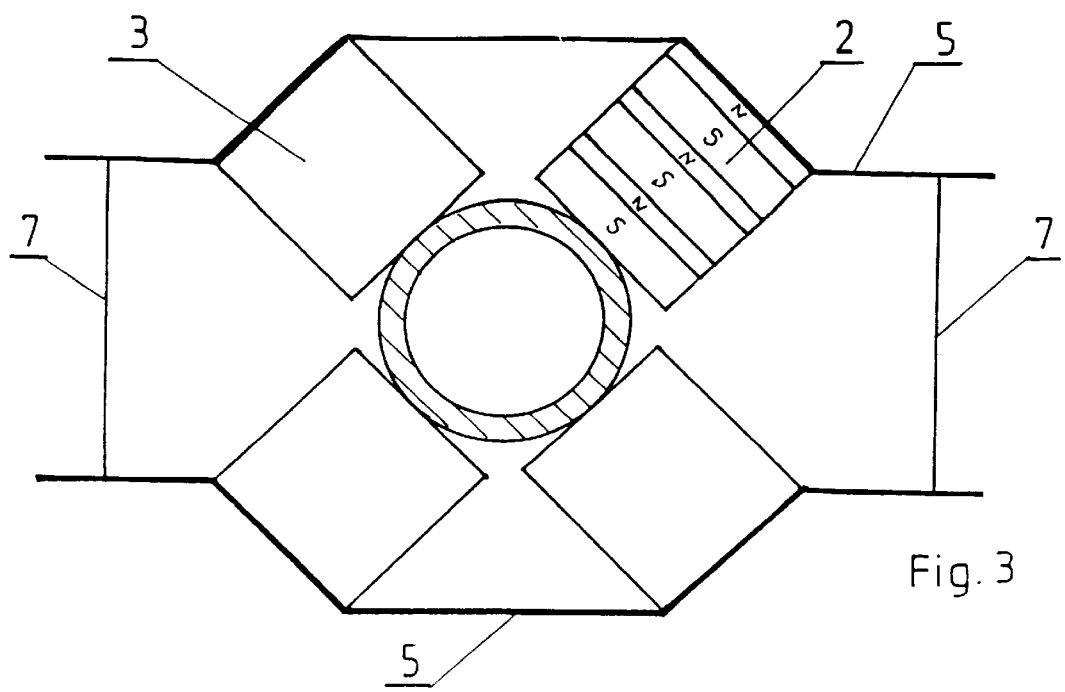
Figure 4:
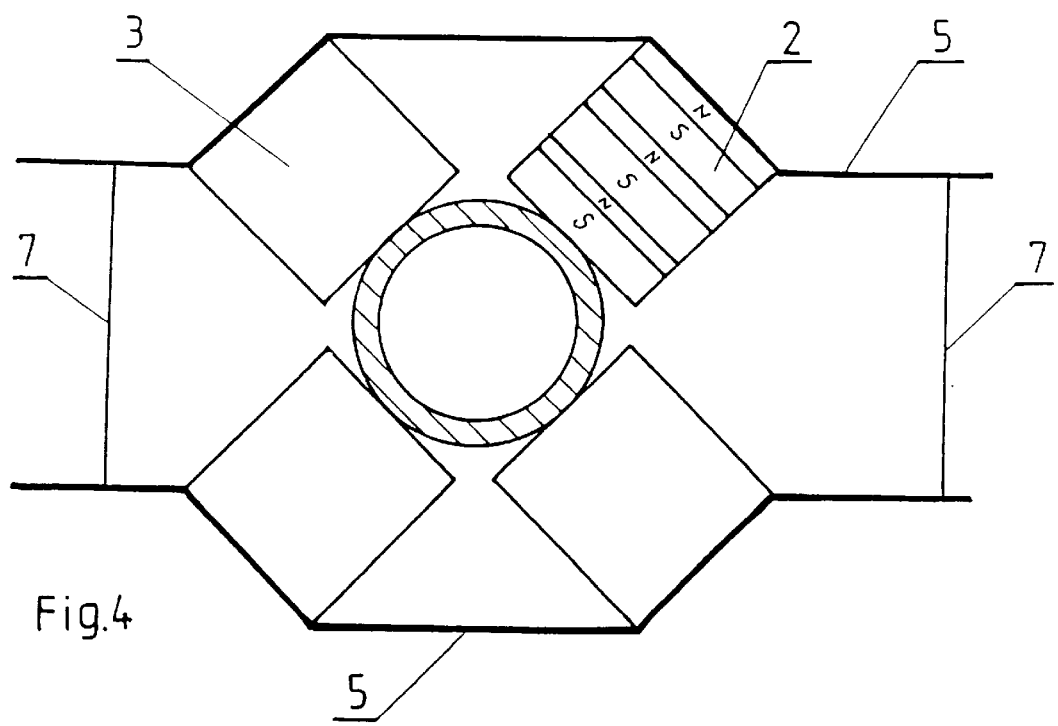

The subject of the invention is presented in the following examples of embodiment, illustrated in the drawing, where:

FIG. 1—is a schematic drawing of the device for carbon dust magnetic activation, FIG. 2—is a schematic drawing of the device for water activation used in smaller diameter pipelines FIG. 3—is a schematic drawing of the device for water and fuel activation used in larger diameter pipelines, FIG. 4—is a schematic drawing of the device for water activation used in food industry

EXAMPLE 1

Magnetic activators, shown in FIG. 1, were used during industrial tests conducted on a rotary cement kiln fuelled with carbon dust. The magnetic activators were assembled on a channel of outside diameter of 520 mm transferring carbon dust, each of activators consisting of a casing 1 made from ferromagnetic material in the shape of a polygon, to which magnetic piles 3 are mounted comprising three permanent magnets 2 of asymmetrical magnetic field energy capacity density between the poles 'N' and 'S' of the magnets. The pole 'S' energy of each magnet 2 in the pile was higher than the pole 'N' energy of the magnet by 78%. The casing 1 together with the piles 3 made up a ring consisting of three segments separated from each other by three grips 4 serving, to connect particular ring segments, radially distributed every 120". Burning process improvement was obtained, the effect of which was a saving of carbon dust within limits of 16%, what gave also better operation of electro-filters. By comparison with it, use of hitherto known devices with 'symmetrical' magnets did not give any savings of carbon dust.

EXAMPLE 2

During researchers conducted on industrial water and steam boilers of the type PTWM-100 and DKWK fuelled with mazout, magnetic activators were assembled on the ducts of 60 mm diameter, the activators comprising piles of permanent magnets, characterized in that magnetic field energy capacity density of the pole 'S' of each magnet in the pile was higher than energy density of the pole 'N' of the magnet by 60%. During repeated accurate tests it was found than flue gas composition changed by drop of carbon dioxide content by 70% to 80% and there was found self-cleaning of the boiler interior from sulphur—carbon deposits settling on heating elements of the boiler.

Considerable saving, amounting 15%, of mazout was gained, the saving being very stable during all period of the tests.

Use of hitherto known activators in the same conditions did not give positive results within limits exceeding apparently measurement errors.

EXAMPLE 3

During experiments conducted by 12 months with open-hearth furnaces fuelled with coke-oven gas, mazout and tars, activators, assembled as in Example 1, were mounted to ducts transferring the fuels.

Magnetic field energy capacity density of the pole 'S' of each magnet in the pile was higher than energy of the pole 'N' of the magnet by 54%. The result of measurements was such that distinct improvement of flue gas composition was obtained by drop of content of CO by 70%, $NO_x$ by 40% and drop of fuel consumption by 22%. Additionally there was found advantageous reduction of scale and increase of furnace refractory lining life in metallurgical furnaces.

Use of hitherto known activators in the same conditions did not give positive results within limits exceeding apparently measurement errors.

EXAMPLE 4

Researches on application of magnetic activators in water systems, both house and industrial systems, for conditioning of water, were conducted in thermal-electric power stations, food industry works, car washing stands.

Activators, shown in FIG. 2, were assembled on the pipeline of 15 to 45 mm outside diameter. They consists of two half-rings 5, on which there are mounted magnetic piles 3 and two bases 6 of rectangular shape, each of two half-rings 5 connecting to one flat base 6 made from ferromagnetic material by means of a clipping strap 7. The magnetic piles 3 comprise permanent magnets 2, in which magnetic field energy capacity density of the pole 'S' of each magnet was higher than energy of the pole 'N' of the magnet by 35% to 40%.

There was obtained considerable reduction of hydraulic resistances, drop of electric and thermal energy consumption by 15% to 30%, protection and full clearance of water systems and cooperating with them equipment.

EXAMPLE 5

During researches conducted on water systems, as in Example 4, magnetic activators were assembled on the pipeline of 40–80 mm outside diameter, each activator consisting of two rings made by connecting together, on the pipeline, two half-rings 5 by means of a clipping strap 7. In the half-rings 5 there are mounted magnetic piles 3 comprising permanent magnets 2, in which magnetic field energy capacity density of the pole 'S' was higher than energy of the pole 'N' of the magnet by 40%.

There was obtained a change of pH from 8.4 to 7.1, a drop of electrolytic conductivity from 1.0 [ms/m] to 0.3 [ms/m], a change of viscosity from 158 [Pa.s] to 128 [Pa.s] and water hardness from 18[° n] to 11[° n]. Moreover, building materials made from gypsum grout, cement and ash mortar with content of magnetically activated water had the Rc strength higher by 30% to 140%.

EXAMPLE 6

Researches on application of magnetic activators, built as in Examples 4 and 5, comprising piles of permanent magnet configuration with diversified magnetic field energy capacity densities between the poles 'N' and 'S' with magnets of the same energy density of the poles, were conducted in a food industry works at a bottle washing stand. The piles 3 comprised two 'asymmetrical' magnets and one each 'symmetrical' magnet, magnetic field energy capacity density of the pole 'S' of each 'asymmetrical' magnet was higher than energy of the pole 'N' of the magnet by 40%.

There was obtained a considerable decrease of hydraulic resistances, stabilization of pH, improvement of water clarity and transparency, and removal of alkaline reaction blooms accumulating on the bottle walls.

Most new activator solutions, described in the above examples, have such configurations of magnets of diversified magnetic field energy capacity densities of the poles 'N' and 'S' that magnetic field energy of the pole 'S' is higher than magnetic field energy of the pole 'N'.

Magnetic activators having piles comprising magnets with dominating magnetic field energy capacity density of the pole 'N' are used for activation of air (oxygen from air) supplied to gas and oil burners, to petrol injection systems etc.

In case of cars, the activators are assembled at the air filter intake.

As a result of use of the above described devices there is obtained minus magnetic activation of oxygen from air, what causes bonding of fuel hydrocarbon particles of plus magnetic charge with oxygen of minus magnetic charge.

Combustion process of hydrocarbon fuels is improved considerably as a result of the above process, the evidence of which is a large reduction of CO and HC in flue gases and increase of carbon dioxide $CO_2$ and flame temperature.

What is claimed is:

1. A method of magnetic activation of solid, liquid and gas media transferred along transport channels, the media undergoing asymmetrical magnetic field activity, characterized in that the media undergo asymmetrical magnetic field produced by permanent magnets of diversified and asymmetrical capacity densities of magnetic field energy between the poles 'N' and 'S' of the magnets so that the value of energy at the side of one of the poles equals up to 190% of the value of magnetic field energy density of the opposite sign pole, the magnets being set into magnet piles and degree of asymmetry of magnetic field energy capacity density, contained in the range from 0.52 to 0.9, is determined depending on kind of medium, flow parameters and kind of material from which the channels transporting medium are made.

2. A device for magnetic activation of solid, liquid and gas media in which permanent magnets of optional shape are connected to a casing, characterized in that the casing (1) is made from para-, dia- and ferromagnetic materials and there are mounted to it permanent magnets (2) of diversified capacity density of magnetic field energy between the poles 'N' and 'S' so that the value of the energy at the side of one of the poles equals up to 190% of the value of magnetic field energy density of the opposite sign pole, the magnets are in piles (3) where magnets (2) of diversified magnetic field energy capacity density between the poles 'N' and 'S' are at least a half of all magnets in a pile (3).

3. A device as claimed in claim 2, characterized in that the magnet piles (3) form spatial arrangements of permanent magnets (2) of diversified energy capacity densities between the poles 'N' and 'S' with magnets of the same energy density of the poles.

4. A method of magnetic activation as claimed in claim 1 wherein the medium is selected from coal dust or hydrocarbon fuels.

5. A device as claimed in claim 2 wherein the medium is selected from coal dust or hydrocarbon fuels.

* * * * *